United States Patent [19]

Brown

[11] 4,023,007
[45] May 10, 1977

[54] BROILER WITH AN ENDLESS BAR CONVEYOR

[75] Inventor: John S. Brown, Half Moon Bay, Calif.

[73] Assignee: N.P.I. Corporation, Burlingame, Calif.

[22] Filed: June 28, 1976

[21] Appl. No.: 700,571

[52] U.S. Cl. .............................. 219/388; 99/386; 99/401; 99/443 C; 219/347; 219/405
[51] Int. Cl.² ......................................... F27B 9/06
[58] Field of Search ....... 219/347, 354, 388, 388 S, 219/405, 411; 99/386, 391, 401, 443 C, 447

[56] References Cited

UNITED STATES PATENTS

| | | | |
|---|---|---|---|
| 3,249,741 | 5/1966 | Mills | 219/388 |
| 3,272,154 | 9/1966 | Kratz | 219/388 X |
| 3,368,063 | 2/1968 | Kuhn | 219/411 |
| 3,467,815 | 9/1969 | Robinson | 219/405 X |
| 3,559,564 | 2/1971 | Turner | 99/443 C X |
| 3,585,360 | 6/1971 | Young et al. | 219/405 |
| 3,586,823 | 6/1971 | Schier | 99/401 |
| 3,591,767 | 7/1971 | Mudie | 219/354 |
| 3,601,582 | 8/1971 | Boisfleury | 219/388 |

*Primary Examiner*—Volodymyr Y. Mayewsky
*Attorney, Agent, or Firm*—Lothrop & West

[57] ABSTRACT

An electric broiler for hamburgers and the like has a supporting frame on which an endless bar conveyor is arranged to advance longitudinally with the conveyor upper run and the conveyor lower run in generally horizontal planes. A set of upper electric heating rods extends longitudinally and transversely of the frame above the upper run, and a set of lower electric heating rods extends horizontally and transversely of the frame below the lower run. Below the lower heating rods on the frame are longitudinally extending radiation baffle boxes generally rectangular in cross-section and arranged with their diagonals substantially vertical and spaced apart transversely to allow drippings to pass between them. There are radiation reflecting dihedral plates extending horizontally and longitudinally on the frame above the upper rods, the dihedral plates being supplemented by top plates supported by the dihedral plates but being largely spaced above the dihedral plates to provide dead air spaces.

8 Claims, 2 Drawing Figures

BROILER WITH AN ENDLESS BAR CONVEYOR

BRIEF SUMMARY OF THE INVENTION

There is provided a broiling device for electrically cooking hamburgers, steaks and comparable products in large numbers and quite uniformly with a mechanism that is easily disassembled for periodic cleaning and sterilization. The device is particularly protected against loss of energy by radiaton and conduction and is arranged to confine the heat to the central cooking zone adjacent a longitudinally operating conveyor comprised of transverse rods spaced apart so that radiation can pass readily between them. To augment confinement of the radiation, there is arranged below the lower run of the conveyor a series of boxes of a rectangular cross-section arranged longitudinally on the frame but slightly spaced apart so that while drippings can run through the spaces between the boxes the radiation is to a large extent baffled or reflected. The upper part of the structure is likewise provided with dihedral plates above the upper heating rods so as to reflect radiation downwardly into the cooking area, and the dihedral plates themselves are supplemented by top plates that partly rest on the dihedral plates and partly are substantially spaced therefrom to enclose some dead air space in the upper part of the device.

DETAILED DESCRIPTION

Figure 1:
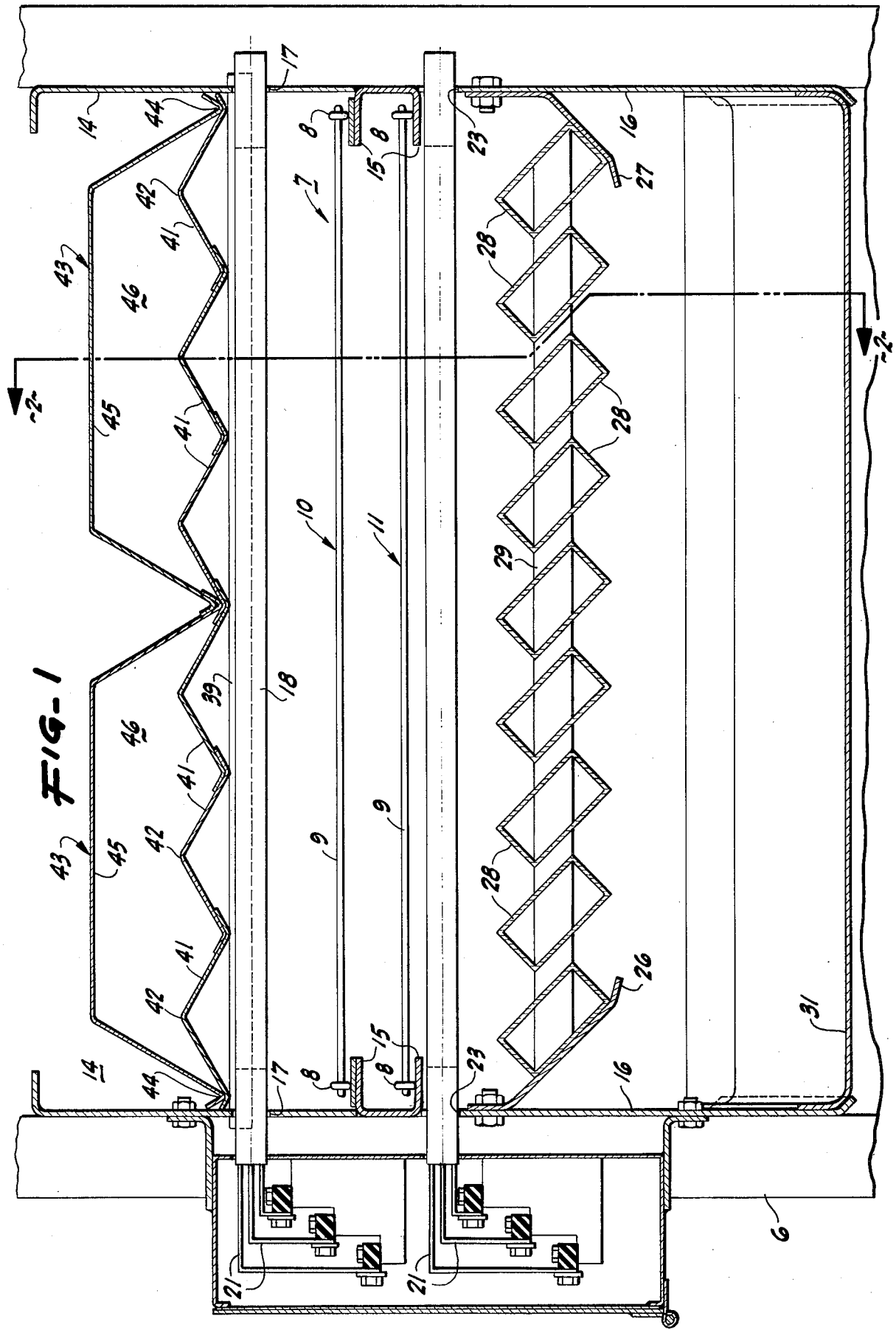
FIG. 1 is a transverse cross-section on a vertical plane through an electric broiler constructed pursuant to the invention, certain parts of the structure being omitted for clarity of disclosure and for reduction in size of the figure.

Particularly for use for the quantity and uniform broiling of meats such as hamburgers, steaks and the like, there is provided a main frame 6 including the customary structural shapes appropriately arranged to provide an approximate enclosure supported from the floor. On the frame there is arranged a conveyor 7 including what in effect are side chains made up of loops 8 at the ends of transversely extending bars 9 usually of metal. The conveyor has an upper run 10 disposed to slide on an upper one of a pair of frame mounted guides 15 in a generally horizontal upper plane and a lower run 11 disposed on the lower one of the guides 15 in an adjacent, generally horizontal lower plane. The conveyor extends around a sprocket pair 12 at one end and around a similar sprocket pair (not shown) at the other end, being suitably driven so that the upper run 10 advances longitudinally in the direction of the arrow 13 in FIG. 1.

Extending longitudinally between portions of the frame 6 are pairs of side plates 14 and 16. The side plates 14, for example, are provided with a number of aligned openings 17 through which are passed electric heating rods 18 arranged in a group occupying a substantially horizontal plane on the frame above the upper run 10. The electric rods are all provided with connections 21 to a suitable source of electric energy, not shown.

In a somewhat similar fashion, the lower pair of side plates 16 is provided with a number of aligned notches 23 in which rest a number of electric heating rods 24 extending transversely of the frame, disposed in a generally horizontal plane below the lower run 11 and having connections 21.

Since during the operation of the structure meats on the conveyor upper run are prone to discharge moisture, fat and other dripping material, the frame has means permitting the drippings to discharge by gravity while interrupting the free escape of radiation from the heating rods 18 and 24. On the frame 6 is a pair of side guides 26 and 27 carrying between them a plurality of bright metal boxes 28. The boxes 28 are substantially rectangular in cross-section and extend longitudinally of the frame. The boxes are secured together at their ends by common straps 29 welded thereto and the end boxes rest on the guides 26 and 27. The group of boxes can be slid into position and can be withdrawn for cleaning. Because of the slant or inclination of the boxes and because they are only slightly spaced apart and because they extend crosswise of the heating rods, radiation from the rods thereabove is for the most part intercepted. Some is reflected back by the bright surface into the interior of the frame to the materials in the cooking zone. Some radiation is converted to an increased temperature of the boxes. Much of the heat so manifested is transferred to air rising convectionally between the boxes and augments the heat in the cooking zone above. Drippings which strike the boxes can move by gravity between them to a lower location, at which a removable grease pan 31 may be provided.

The escape of radiation and evolved materials endwise of the lower portion of the structure is generally precluded by an entrance hanger plate 32 spanning the end of the box array and hanging by gravity on a cross rod 33 on the frame. Similarly, at the other end there is a cross rod 34 on the frame on which is hung an exit end plate 36. The plates 32 and 36 and the side plates 16 provide an approximately confined lower enclosure. By removal of the plate 32 and the rod 33, for example, the cross strap 29 and the boxes 28 assembled therewith can be slid horizontally from the guides 26 and 27 for cleaning and restoration. Similarly, any grease pan can likewise be removed and replaced.

In a similar fashion means are provided for blocking the unwanted escape of radiation, fumes and the like from the upper portion of the structure. For that reason, the two side plates 14 are provided with additional openings 37 and 38 through which support bars 39 are introduced and supported. On these bars, which lie slightly above the electric rods 18, are disposed bright metal dihedral plates 41 arranged with their ridges 42 extending longitudinally. The plates 41 can be made as separate, formed pieces overlapping each other or can be spot welded together or made integrally. In any event, the arrangement affords ready removal and cleaning.

Supplementing the dihedral plates 41 are top plates 43, likewise of a somewhat dihedral nature and having their lower peripheral edges 44 arranged to rest on the dihedral plates, although the intermediate portions 45 thereof are spaced substantially above the dihedral plates in order partly to enclose an intervening dead air space 46. The ends of the spaces 46 are closed by hanger plates 47 depending from pins 48 upstanding from the top plates 43. In this way the dihedral plates 41 tend to reflect back into the cooking zone radiation from all of the interior parts, and conduction through the dihedral plates is inhibited by the presence of the dead air spaces 46.

Figure 2:
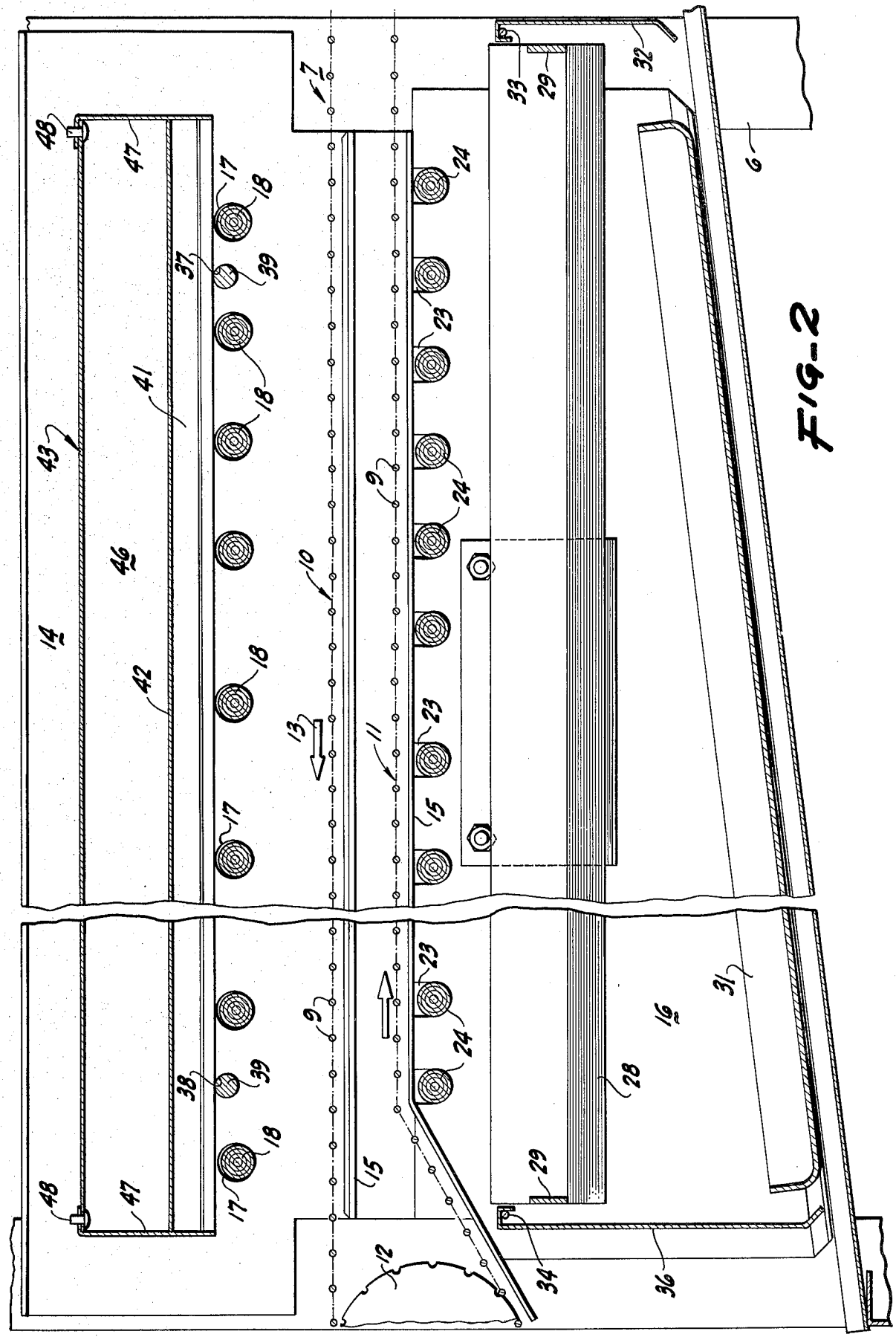
FIG. 2 is a cross-section, the planes of which are indicated by the lines 2—2 of FIG. 1.

In the operation of this structure, when the machine is entirely assembled and the conveyor and the electric heating rods are energized, then a series of hamburger patties, for example, placed on the upper run of the conveyor 7 at the right end thereof, as seen in FIG. 2, advances through the machine from right to left. Both sides of the hamburger patties are simultaneously cooked largely by radiation from the heating elements 18 and 24 and radiant energy reflected from the boxes 28 and the plates 41. The presence of the returning and moving lower run 11 of the bar conveyor does not substantially interfere with the radiant transmission of energy to the patties from the lower rods 24.

Drippings from the meat patties are usually burned off of the intervening, lower heating rods 24. Other drippings may deposit on and run by gravity down over the lower boxes 28. These not only reflect radiation upwardly toward the cooking but enclose dead air to reduce the amount of conduction in a downward direction. Drippings that pass between the adjacent boxes fall onto the grease pan for ultimate removal.

There is thus provided an easily disassembled and assembled enclosure for electrically broiling meats and the like not only to make cleaning and sanitation easy and economical but also to conserve energy by restricting escape of radiating and conducted heat.

What is claimed is:

1. An electric broiler comprising a frame, an endless bar conveyor having an upper run and a lower run, means on said frame for supporting said upper run and said lower run in horizontal planes, upper electric heating rods, means on said frame for supporting said upper rods in a horizontal plane above said upper run, lower electric heating rods, means on said frame for supporting said lower rods in a horizontal plane below said lower run, means on said frame below said lower rods for baffling downward radiation, said baffling means including a plurality of spaced apart, hollow boxes, and means on said frame above said upper rods for reflecting upward radiation, said reflecting means including a plurality of dihedral plates.

2. A device as in claim 1 in which said runs advance longitudinally of said frame, said rods extend transversely of said frame, and said boxes are elongated and extend longitudinally of said frame.

3. A device as in claim 1 including a sub-frame, means for securing said boxes to said sub-frame, and means for slidably mounting said sub-frame on said main frame.

4. A device as in claim 1 in which said boxes are rectangular in cross-section and are disposed with a diagonal thereof substantially vertical.

5. A device as in claim 4 in which said boxes are of bright, reflecting metal.

6. A device as in claim 1 in which said dihedral plates are of bright, reflecting metal.

7. A device as in claim 1 in which said plates have their ridges extending longitudinally of the frame.

8. A device as in claim 1 including top plates peripherally engaging said dihedral plates and centrally spaced from said dihedral plates at least partially to enclose dead air spaces.

* * * * *